US010295100B1

(12) United States Patent
Handley et al.

(10) Patent No.: US 10,295,100 B1
(45) Date of Patent: May 21, 2019

(54) VARIABLE FLOW MODULE FOR CONTROLLED FLOW OF FLUID

(71) Applicant: Joelex, Inc., Chicago, IL (US)

(72) Inventors: Daniel A. Handley, Chicago, IL (US); Charles Robert Gass, Imlay City, MI (US)

(73) Assignee: Polycarb Innovations LLC, Dover, DE (US)

( * ) Notice: Subject to any disclaimer, the term of this patent is extended or adjusted under 35 U.S.C. 154(b) by 10 days.

(21) Appl. No.: 15/332,074

(22) Filed: Oct. 24, 2016

Related U.S. Application Data

(60) Provisional application No. 62/244,840, filed on Oct. 22, 2015.

(51) Int. Cl.
*F15D 1/02* (2006.01)
*F16L 55/027* (2006.01)

(52) U.S. Cl.
CPC ............ *F16L 55/027* (2013.01); *F15D 1/025* (2013.01)

(58) Field of Classification Search
CPC .......... F16L 1/025; F16L 55/027; F15D 1/025
USPC ............................................ 138/45, 46, 94.5
See application file for complete search history.

(56) References Cited

U.S. PATENT DOCUMENTS 2,037,663 A * 4/1936 Lalor ........................ F16K 3/03 137/556
2,181,261 A * 11/1939 Breese ...................... F23D 5/00 138/45
2,205,983 A * 6/1940 Kraber .................. F23D 11/001 138/45
2,321,336 A * 6/1943 Tondreau .................. F16K 3/03 138/44
2,649,272 A * 8/1953 Barbato .................... F16K 3/03 138/43
3,106,225 A * 10/1963 Spurling ................... G01F 1/42 137/468
3,659,822 A * 5/1972 Nagy ...................... F16K 3/312 138/94.5
4,094,492 A * 6/1978 Beeman .................... F16K 3/03 138/45
8,316,820 B1 * 11/2012 Cammarata ............... F16K 3/03 123/336
2006/0261303 A1 * 11/2006 Thomas .................... F02D 9/14 251/212

* cited by examiner

*Primary Examiner* — James F Hook
(74) *Attorney, Agent, or Firm* — Scherrer Patent & Trademark Law, P.C.; Stephen T. Scherrer; Monique A. Morneault

(57) ABSTRACT

A variable flow module controls flow of a fluid through a fluid distribution system. More specifically, the variable flow module comprises one or more rotatable elements allowing for the flow of the fluid, such as water, to vary in flow volume through a pipe.

20 Claims, 9 Drawing Sheets

VARIABLE FLOW MODULE FOR CONTROLLED FLOW OF FLUID

The present invention claims priority to U.S. Provisional Pat. App. No. 62/244,840, titled "Variable Flow Module for Controlled Flow of Water Distribution," filed Oct. 22, 2015, which is incorporated herein by reference in its entirety.

TECHNICAL FIELD

The present invention relates to a variable flow module for controlled flow of a fluid. More specifically, the variable flow module comprises one or more rotatable elements allowing for the flow of the fluid, such as water, to vary in flow volume through a pipe.

BACKGROUND

Typical flow restrictors in water distribution systems are either 1) single state restriction orifices; 2) single stage, multi-hole restriction orifices; 3) multi-stage restriction orifice plate assemblies, or 4) a combination of the above.

However, none of these orifice plates allow for variable flow, and in the situation where flow/pressure changes due to changing water requirements, typical flow restrictors must be swapped with new flow restrictors to achieve the desired flow restriction and control. A need, therefore, exists for a variable flow module for controlling the flow of water distribution systems. Further, a need exists for a variable flow module for controlling the flow of water distributions systems, whereby the variable flow module may be easily changed from one flow restriction setting to another flow restriction setting, either manually or automatically via a control system.

SUMMARY OF THE INVENTION

The present invention relates to a variable flow module for controlled flow of a fluid. More specifically, the variable flow module comprises a shutter or iris element allowing for the flow of the fluid, such as water, to vary in flow volume through a pipe.

To this end, in an embodiment of the present invention, a variable flow module is provided. The variable flow module comprises a first plate having a first orifice configuration, and a second plate having a second orifice configuration, and a gasket between the first plate and the second plate, wherein the first and second orifice configurations align in a first orifice configuration combination to allow water flow therethrough, and further wherein axially turning the second plate in relation to the first plate forms a second orifice configuration combination, wherein the second orifice configuration combination restricts water flow therethrough to a greater extent than the first orifice configuration combination.

In an embodiment, the variable flow module comprises a third plate having the first orifice configuration, wherein the second plate is disposed between the first plate and the second plate, and a gasket is disposed between the second plate and the third plate.

In an alternate embodiment of the present invention, a variable flow module apparatus is provided. The variable flow module apparatus comprises a first plate having a first orifice; a second plate having a second orifice; a first rotatable element comprising a first end and a pivoting pin extending from the first end thereof on a first side thereof and rotatably disposed in the first plate, and a second pin extending from a point proximal the first end thereof on a second side thereof, the second pin engaging a first slot in the second plate; a second rotatable element comprising a first end and a pivoting pin extending from the first end thereof on a first side thereof and rotatably disposed in the first plate, and a second pin extending from a point proximal the first end thereof on a second side thereof, the second pin engaging a second slot in the second plate; and a handle extending from the second plate, wherein movement of the handle causes the second plate to rotate between a first position and a second position, thereby causing the first and second rotatable elements to move toward each other when the handle moves to the first position and away from each other when the handle moves to the second position as the second pin of the first rotatable element travels within the first slot of the second plate and the second pin of the second rotatable element travels within the second slot of the second plate.

In an embodiment, the first pin of the first rotatable element is rotatably engaged in an aperture in the first plate.

In an embodiment, the first pin of the second rotatable element is rotatably engaged in an aperture in the first plate.

In an embodiment, the variable flow module apparatus further comprises a space between the first and second rotatable elements, wherein the space gets larger when the handle causes the first and second rotatable elements to move away from each other, and the space gets smaller when the handle causes the first and second rotatable elements to move towards each other.

In an embodiment, the variable flow module apparatus further comprises a first gasket disposed between the first plate and the rotatable plate; and a second gasket disposed between the second plate and the rotatable plate.

In an embodiment, the gaskets are O-rings.

In an embodiment, the variable flow module apparatus further comprises a first flange connected to a first pipe segment, the first pipe segment connected to the first plate; and a second flange connected to a second pipe segment, the second pipe segment connected to the second plate.

In an embodiment, the second plate comprises a depression to hold the first and second curved elements.

In an embodiment, the variable flow module apparatus further comprises a plurality of bolts holding the first plate, the second plate and the rotatable plate together.

In an embodiment, the variable flow module apparatus further comprises a plurality of slots in the rotatable plate to receive the plurality of bolts, wherein the plurality of slots allows rotation of the rotatable plate when the handle rotates the rotatable plate.

In a further alternate embodiment of the present invention, a method of restricting fluid flow through a pipe system is provided. The method comprises the steps of: providing a variable flow module apparatus comprising a first plate having a first orifice; a second plate having a second orifice; a first rotatable element comprising a first end and a pivoting pin extending from the first end thereof on a first side thereof and rotatably disposed in the first plate, and a second pin extending from a point proximal the first end thereof on a second side thereof, the second pin engaging a first slot in the second plate; a second rotatable element comprising a first end and a pivoting pin extending from the first end thereof on a first side thereof and rotatably disposed in the first plate, and a second pin extending from a point proximal the first end thereof on a second side thereof, the second pin engaging a second slot in the second plate; and a handle extending from the second plate, wherein movement of the handle causes the second plate to rotate between a first position and a second position, thereby causing the first and second rotatable elements to move toward each other when the handle moves to the first position and away from each other when the handle moves to the second position as the second pin of the first rotatable element travels within the first slot of the second plate and the second pin of the second rotatable element travels within the second slot of the second plate, wherein the variable flow module apparatus is disposed between a first pipe and a second pipe having fluid flowing therethrough; moving the handle to change the volume of the fluid through the variable flow module apparatus.

In an embodiment, moving the handle comprises moving the handle in a first direction, which causes the first and second rotatable elements to move toward each other causing a space between the first and second rotatable elements to get smaller, thereby decreasing the flow of fluid through the variable flow module apparatus.

In an embodiment, moving the handle comprises moving the handle in a second direction, which causes the first and second rotatable elements to move away from each other causing a space between the first and second rotatable elements to get larger, thereby increasing the flow of fluid through the variable flow module apparatus.

In an embodiment, the handle is moved manually.

In an embodiment, the handle is moved automatically via a controller.

In an embodiment, the controller moves the handle based on feedback from a sensor.

In an embodiment, the variable flow module apparatus further comprises a first flange connected to a first pipe segment, the first pipe segment connected to the first plate; and a second flange connected to a second pipe segment, the second pipe segment connected to the second plate.

In an embodiment, the variable flow module apparatus further comprises a first gasket disposed between the first plate and the rotatable plate; and a second gasket disposed between the second plate and the rotatable plate.

In an embodiment, the first and second gaskets are O-rings.

In an embodiment, the rotatable plate comprises at least one slot and a bolt disposed through the slot, the slot restricting rotation of the rotatable plate between the first position and the second position.

It is, therefore, an advantage and objective of the present invention to provide a variable flow module for controlling the flow of water distribution systems.

Further, it is an advantage and objective of the present invention to provide a variable flow module for controlling the flow of water distributions systems, whereby the variable flow module may be easily changed from one flow restriction setting to another flow restriction setting.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to a variable flow module for controlled flow of a fluid. More specifically, the variable flow module comprises one or more rotatable elements allowing for the flow of the fluid, such as water, to vary in flow volume through a pipe.

Figure 1:
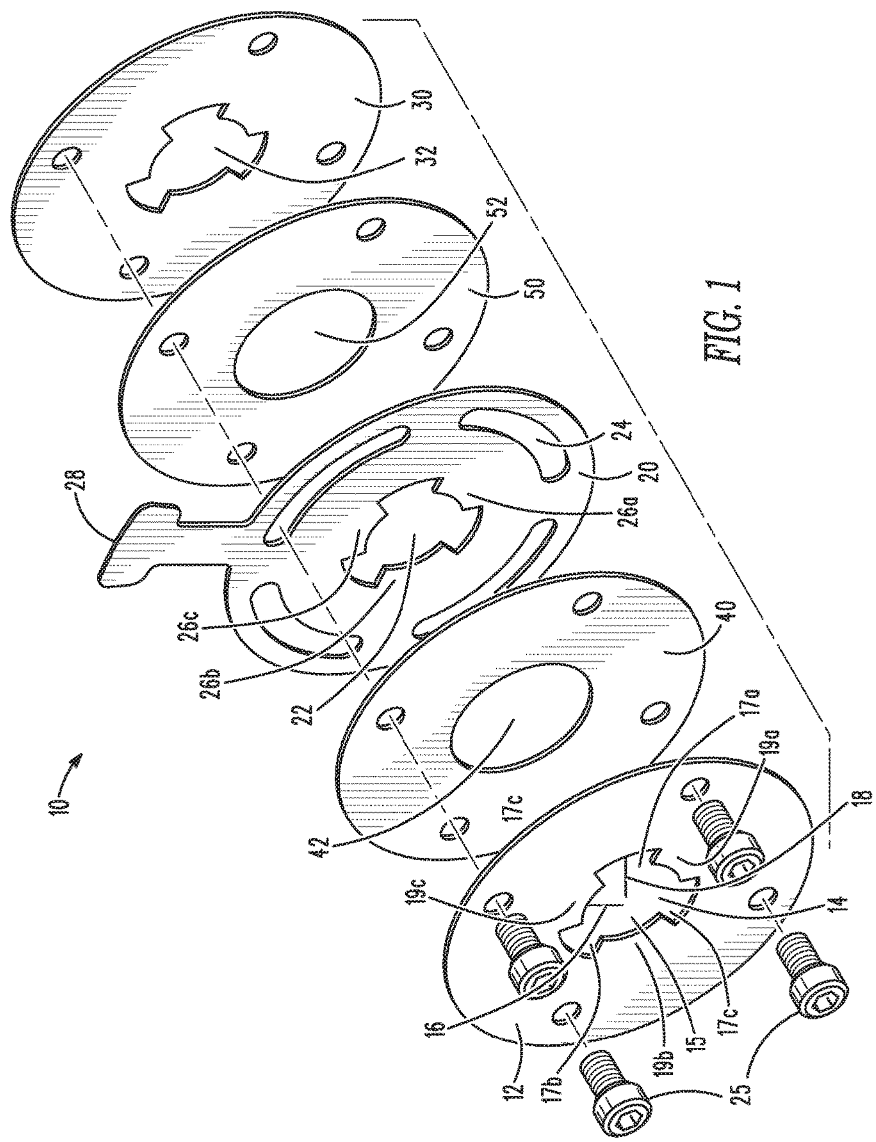
FIG. 1 illustrates an exploded view of a variable flow module for fluid flow distribution systems in an embodiment of the present invention.

Now referring to the figures, wherein like numerals refer to like parts, FIG. 1 illustrates an exploded view of a variable flow module 10 for fluid distribution systems, such as, for example, water distribution systems using pipes. The variable flow module 10 comprises a first plate 12 having a first orifice configuration 14. The first orifice configuration 14 comprises an inner opening section 15 having a first radius 16, and three larger opening sections 17*a*, 17*b*, 17*c* disposed radially around the inner section 15 and having a second radius 18 larger than the first radius 16. Wings 19*a*, 19*b* 19*c* may form the inner opening section 15, having the first radius 16.

The variable flow module 10 comprises a second plate 20 having a second orifice configuration 22, wherein the second orifice configuration 22 is identical to the first orifice configuration 14 such that when the first orifice plate 12 and the second orifice plate 20 are aligned together to allow fluid to flow therethrough, the first plate 12 and the second plate 20 form a first orifice combination configuration that matches both the first orifice configuration 14 and the second orifice configuration.

The variable flow module 10 further may comprise a third plate 30 having a third orifice configuration 32, wherein the third orifice configuration 32 is identical to the first orifice configuration 14 and the second orifice configuration 22. A first gasket 40 may be disposed between the first and second plates 12, 20, respectively, and a second gasket 50 may be disposed between the second and third plates 20, 30, respectively to aid in sealing the plates so that leakage does not occur. The first and second gaskets 40, 50 comprise open flow orifices 42, 52, respectively allowing unrestricted water flow therethrough relative to the first, second and third plates 12, 20, 30.

In practice, the first and third plates are static and therefore the first and third orifice configurations 14, 32 remain aligned to allow the greatest flow of water therethrough. The second plate 20 further comprises a plurality of slots 24 disposed therearound that allow the second plate to be rotated relative to the first and second plates 12, 30. The slots 24, in conjunction with a plurality of pins or bolts 25, may allow the second plate 20 to rotate axially, such as when a user moves handle 28. Thus the second orifice configuration 22 may also rotate axially in relation to the first and third orifice configurations 14, 32, respectively. The second orifice configuration 22 may have wings 26*a*, 26*b*, 26*c* that may thus align with the second opening sections 17*a*, 17*b*, 17*c* to block the flow of water through the second opening sections 17*a*, 17*b*, 17*c*. Thus, the second plate 20 may axially rotate and allow water to flow therethrough in the first orifice combination configuration or, when rotated, in a second orifice combination configuration that provides for flow restriction to a larger extent than the first orifice combination configuration.

Figure 2:
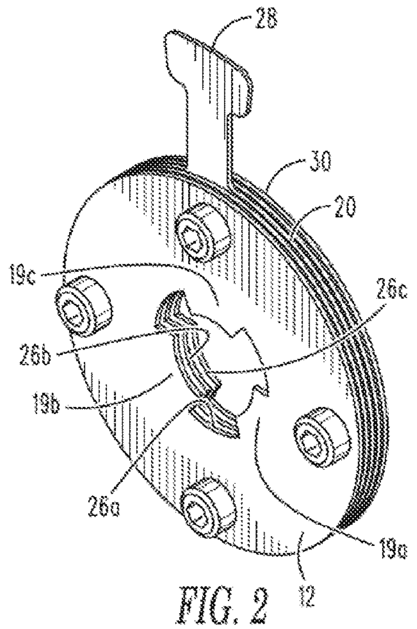
FIG. 2 illustrates a perspective view of a variable flow module for fluid flow distribution systems in a fully open configuration in an embodiment of the present invention.
Figure 3:
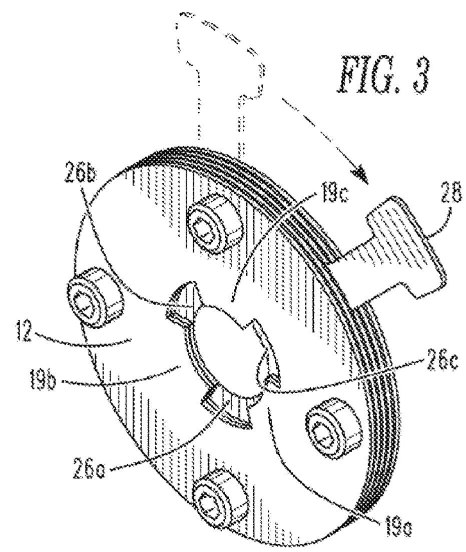
FIG. 3 illustrates a perspective view of a variable flow module for fluid flow distribution systems in a fully closed configuration in an embodiment of the present invention.

FIG. 2 illustrates the variable flow module 10 in the first orifice combination configuration, allowing water to flow therethrough to the largest extent. Wings 26*a*, 26*b*, 26*c* of the second plate 20 may be aligned with wings 19*a*, 19*b*, 19*c* of the first plate 12 thereby allowing the largest volume of fluid to flow therethrough. This may be referred to as the "fully open" configuration. As described above and illustrated in FIG. 3. rotation of the handle 28 may rotate wings 26*a*, 26*b*, 26*c* into a position that covers open sections 17*a*, 17*b*, 17*c*, thereby restricting the flow of fluid therethrough to a smaller volume, relative to the fully open configuration. This may be referred to as the "fully closed" configuration. However, it should be noted that the fully closed configuration still allows a volume of fluid to flow therethrough. The volume of fluid through the module 10 in the fully closed configuration is less than the volume of fluid through the module 10 in the fully open configuration. The handle 28 may be disposed at any position between the fully open and fully closed configuration, allowing for intermediate volumes of fluid to flow through the module 10.

Figure 4:
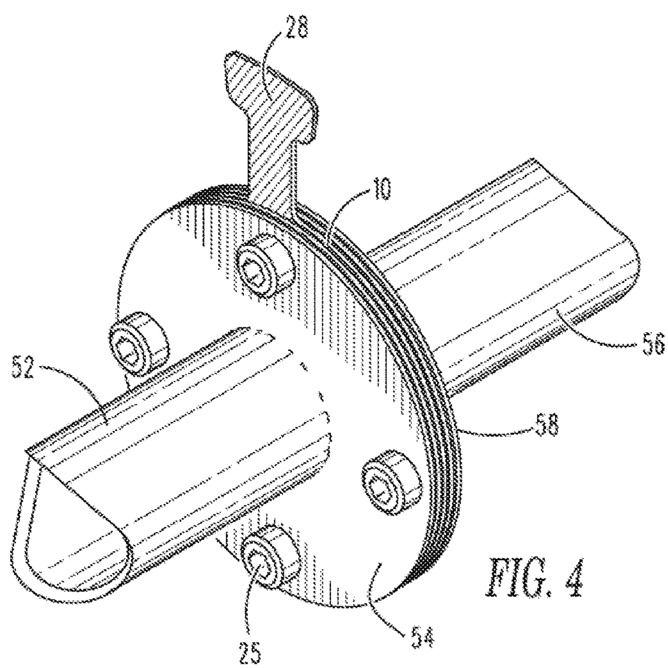
FIG. 4 illustrates a perspective view of a variable flow module within a fluid flow distribution system in an embodiment of the present invention.

The variable flow module 10 may be incorporated into a fluid distribution system 50, as illustrated in FIG. 4. Specifically, the variable flow module 10 may be disposed in line with a first pipe 52 having a flange 54 and a second pipe 56 having a flange 56. The flanges 54, 56 may be utilized to attach to the variable flow module 10 via pints or bolts 25. Moreover, although not shown in the figures, the handle 28 may be moved manually or automatically through an actuator that may be move the handle from the fully open to the fully closed configurations, and to any intermediate configuration as desired.

Figure 5:
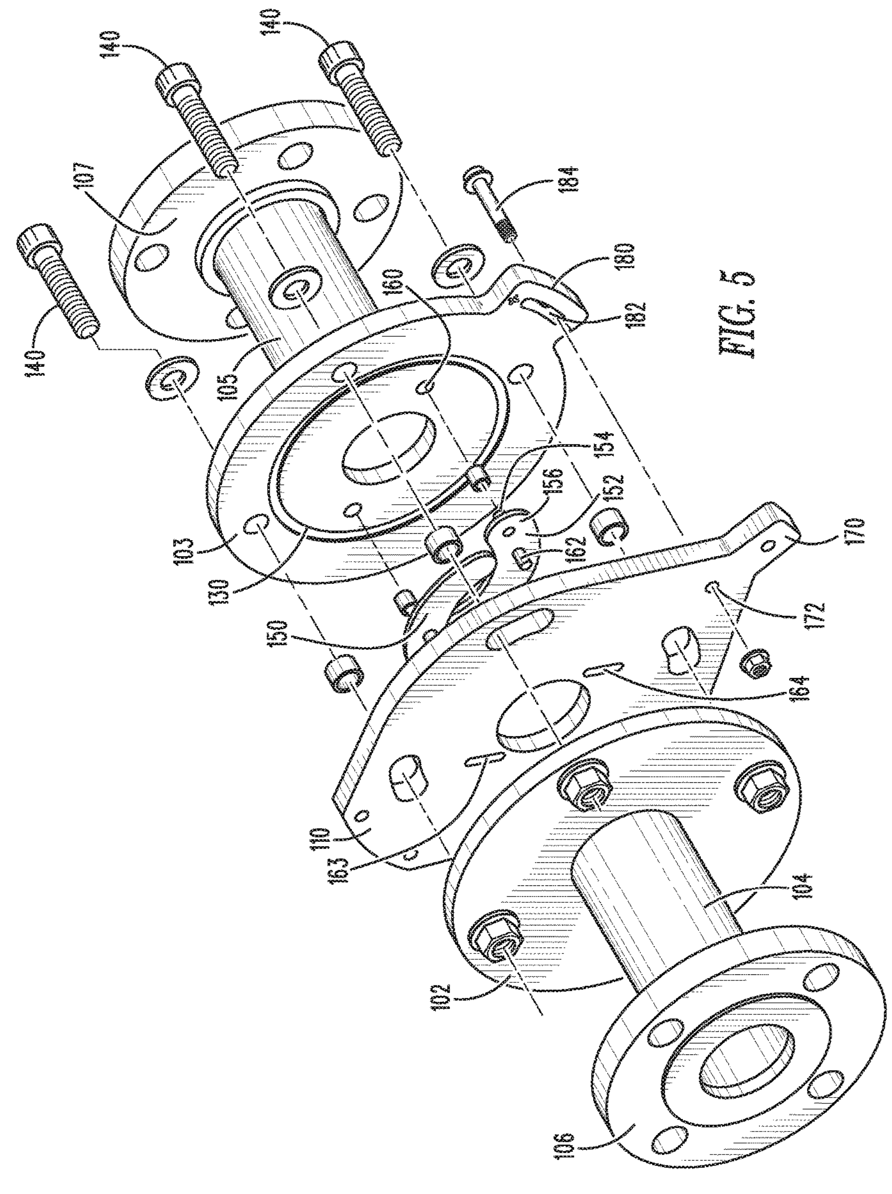
FIG. 5 illustrates an exploded view of a variable flow module for fluid flow distribution systems in an alternate embodiment of the present invention.

FIG. 5 illustrates a variable flow module 100 in an alternate embodiment of the present invention. The variable flow module 100 operates to open and close between a fully open configuration and a fully closed configuration. However, the variable flow module 100 utilizes a pair of rotating segments that open and close relative to each other based on the turning of a handle, as described in more detail below.

Specifically, FIG. 5 illustrates an exploded view of the variable flow module 100 comprising a first main flange 102 and a second main flange 103, each of which may have pipe segments 104, 105, respectively, extending therefrom and first and second smaller flanges 106, 107 attached to each of the pipe segments 104, 105, respectively. The first and second main flanges 102, 103 may also be referred to herein as first and second main plates having apertures therein for allowing fluid to flow therethrough. First and second smaller flanges 106, 107 may connect, such as through bolts or the like to pipe sections (not shown) to form part of a larger fluid distribution system.

Rotatable plate 110 may be disposed between first and second main flanges 102, 103. Rotatable plate 110 may have aperture 112 disposed therein that may be the same or similar shape and size, and may further align together, and further align with the pipe segments 104, 105. Thus, fluid flowing through pipe segments 104, 105 may further flow through aperture 112 in rotatable plate 110.

Any number of gaskets, O-rings, and other like sealing elements may be utilized to ensure that the module 100 does not leak fluids when fluids flow therethrough. Specifically, as illustrated in FIG. 5, O-ring 130 may be positioned between the second main flange 103 and the rotatable plate 110 to seal the same when bolted together with bolts 140. A similar gasket, such as an O-ring, may be positioned between first main flange 102 and the rotatable plate 110 to seal the same when bolted together with bolts 140.

First and second curved rotating elements 150, 152, respectively, may be disposed between the rotatable plate 110 and the second main flange 103, and may rotate relative to each other on respective axes to open and close a space between them, thereby increasing or decreasing the volume of fluid that flows therebetween. The first and second curved rotating elements 150, 152 may be positioned over the aperture 112 to alternately open and close to allow and restrict fluid flow therebetween and through aperture 112. Each of the first and second curved rotating elements 150, 152 may be roughly kidney-shaped, having preferably a side having an inward curve. The first and second curved rotating elements 150, 152 may be in face-to-face arrangements, whereby the sides with the inward curves may be facing each other. Therefore, when the first and second curved rotating elements 150, 152 are in a "closed" position, the inward curves of each may still allow a minimum flow of fluid therethrough, as the inward curves prevent the elements 150, 152 from fully closing and cutting off fluid flow.

For example, in FIG. 5, second curved rotating element 152 is visible in sufficient detail to illustrate a pivoting pin 154 on a first end 156 of the second curved rotating element 152 that may align with a sleeve 158 that may surround the pivoting pin 154 and provide easy rotating of the pivoting pin 154, wherein the pivoting pin 154 and sleeve 158 may align with a hole 160 within the second main flange 103. Thus, the pivoting pin 154 may rotate freely within the hole 160, allowing the second rotating element 152 to rotate about an axis formed by the pivoting pin 154.

Second curved rotating element 152 may further comprise a traveling pin 162 extending from a location proximal the first end 156 of the second curved rotating element 152. The traveling pin 162 may align with a slot 164 disposed in the rotating plate 110. The traveling pin 162 may travel within the slot 164 when the rotatable plate 110 rotates, as described in more detail below. As the rotatable plate 110 rotates, the traveling pin may travel only within the path of the slot 164, thereby moving the second curved rotating element 152 about the axis formed by the pivoting pin 154. Thus, the second curved rotating element 152 may move to alternately cover and expose the aperture 112 depending on the direction the rotatable plate 110 rotates.

First curved rotating element 150 may have the same or similar elements, as are shown in more detail below, but operate in the same or similar manner as the second curved element 152 to move the first curved element 152 to alternately cover and expose the aperture 112 depending on the direction the rotatable plate 110 rotates. Thus, the rotatable plate 110 may be rotated, and the first and second curved elements 150, 152 may move in conjunction to cover or mostly cover the aperture 112, thereby restricting flow of fluid therethrough, or expose or mostly expose the aperture 112, thereby allowing flow of fluid therethrough.

Figure 6:
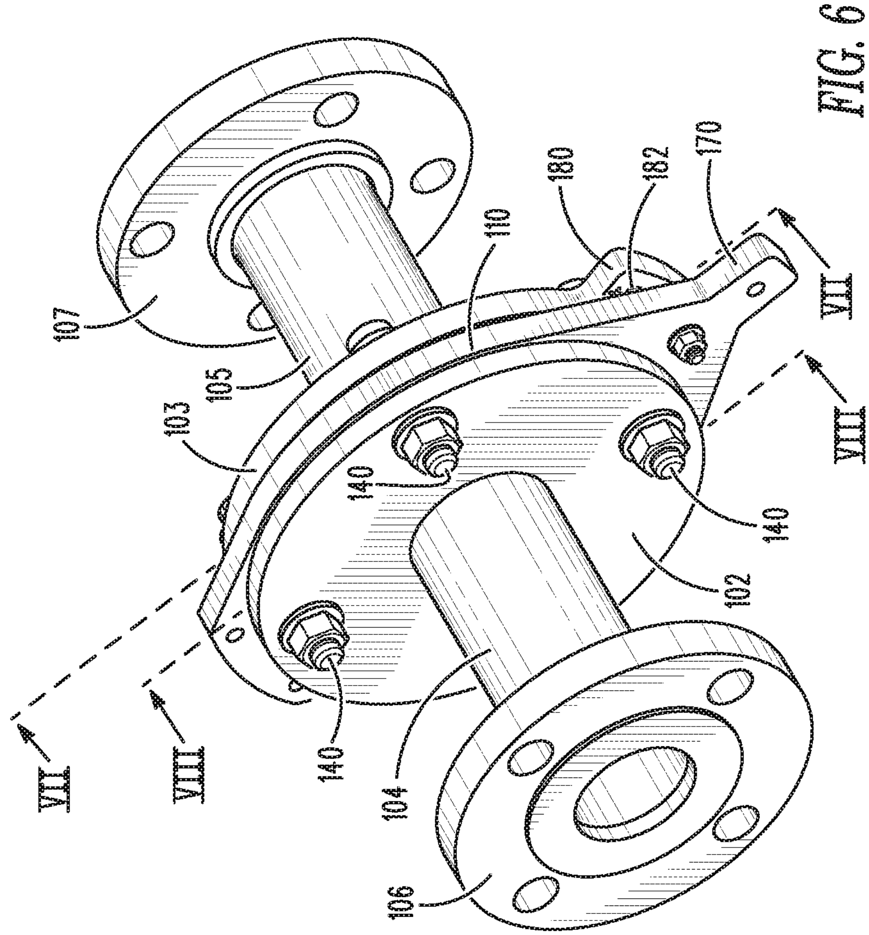
FIG. 6 illustrates a perspective view of a variable flow module for fluid flow distribution systems in a closed configuration in an alternate embodiment of the present invention.

FIG. 6 illustrates a perspective view of variable flow module 100 wherein the rotatable plate 110 is rotated into a "closed" position, whereby the first and second curved elements 150, 152 cover or mostly cover the aperture 112 to restrict the flow of fluid therein. Rotatable plate 110 may comprise a handle 170 that may pushed and/or pulled to alternately open and close the first and second curved elements 150 to alternately allow and restrict fluid flow therethrough. The handle may have a hole 172 to receive a bolt or a pin 184 that may be disposed therethrough. The bolt or pint 184 may further extend through a wing 180 extending from the second main flange 103 having a slot 182 therein. Thus, the bolt or pin 184 may restrict the rotation of the rotatable plate 110 to the distance allowable by the slot 182. As noted on wing 180, moving the handle toward the "-" position may close the first and second curved elements 150, 152 over the aperture 112, thereby restricting the flow of fluid therethrough, as illustrated in FIG. 6. Alternatively, rotating the handle toward the "+" position on the wing 180 may open the first and second curved elements 150, 152 over the aperture 112, thereby allowing the flow of fluid therethrough, as illustrates in FIG. 9.

Figure 7:
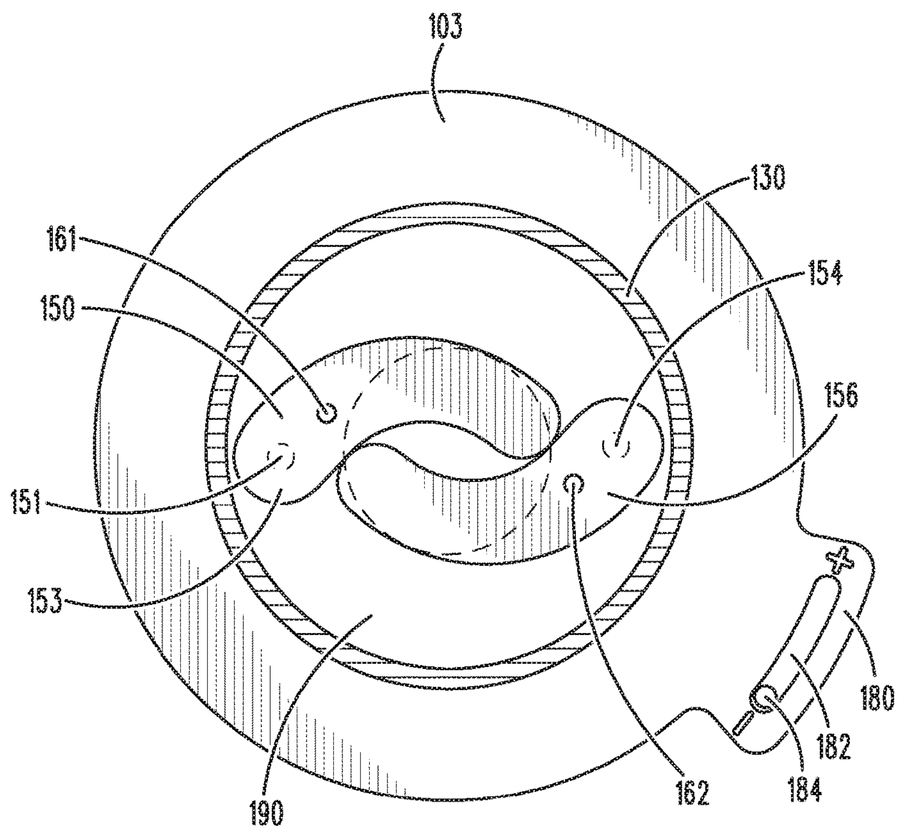
FIG. 7 illustrates a cross-sectional view of a variable flow module for fluid flow distribution systems along lines VII-VII in an alternate embodiment of the present invention.

FIG. 7 illustrates a cross-sectional view of the variable flow apparatus 100 along lines VII-VII in FIG. 6. Specifically, FIG. 7 illustrates a view of second main flange 103 having O-ring 130, and first and second curved elements 150, 152 that are rotated toward each other to close and restrict fluid flow therethrough. First and second curved elements may be positioned within a depression 190 that seats the first and second curved elements without restricting the second main flange 103 from sealing against rotatable plate 110 when bolted together via bolts 140.

Figure 8:
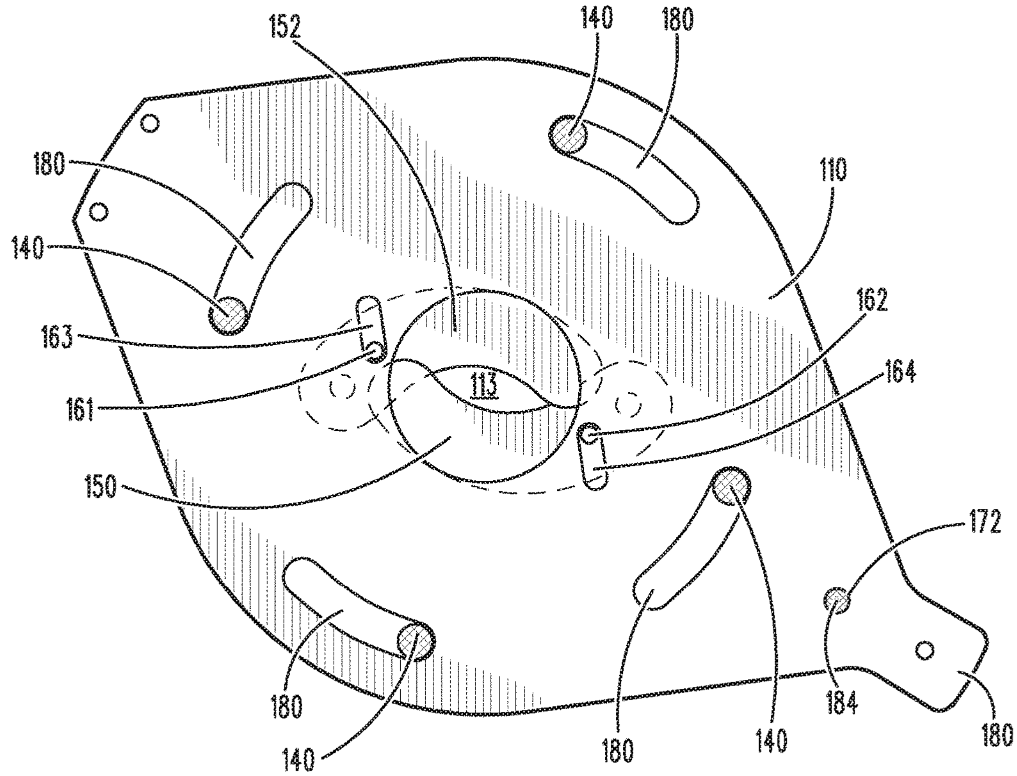
FIG. 8 illustrates a cross-sectional view of a variable flow module for fluid flow distribution systems along lines VIII-VIII in an alternate embodiment of the present invention.

As illustrated, first curved element 150 comprises a pivoting pin 151 that may be rotatably disposed within the second main flange 103 (shown in phantom in FIG. 7) on a first end 153 of the first curved element 150. Further, first curved element 150 may comprise a traveling pin 161 that may travel within a slot 163 within rotatable plate 110, as illustrated in FIG. 8 when the rotatable plate 110 rotates. Further, second curved element 152 may have the pivoting pin 154 disposed on the first end 156 thereof, which may be rotatably disposed within the second main flange 103 (as shown in phantom in FIG. 7), and further may comprise the traveling pin 162 that may travel within slot 164 in the rotatable plate 110, as illustrated in FIGS. 6 and 8.

Moreover, FIG. 7 illustrates that the pin or bolt 184 is disposed toward the "-" position by rotation of the handle 170 (as illustrated in FIGS. 6 and 8), which causes the traveling pins 161, 162 to travel within the slots 163, 164.

FIG. 8 illustrates a cross-sectional view of the variable flow apparatus 100 along lines VIII-VIII of FIG. 6, illustrates a plan view of the rotatable plate 110, rotated to cause the first and second curved elements 150, 152 to close and restrict fluid flow through the aperture 112. Specifically, traveling pins 161, 162 may be disposed on one end of each of the slots 163, 164, whereby the positioning of the traveling pins 161, 162 is caused by rotating of the handle toward the "-" position. As the traveling pins 161, 162 move through the slots 163, 164, the first and second curved elements rotate and close toward each other.

Rotatable plate 110 further comprises bolt slots 180 allowing the rotatable plate 110 to rotate without restriction from bolts 140 that may bolt the first and second main flanges, as well as the rotatable plate 110, together.

Figure 9:
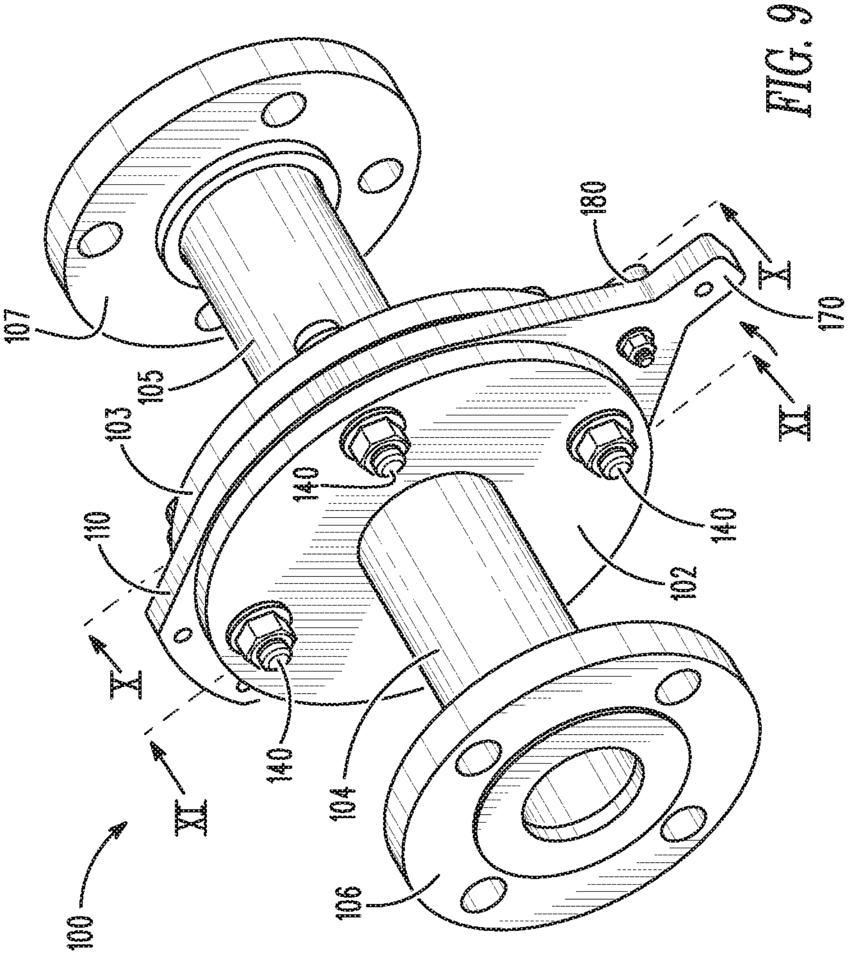
FIG. 9 illustrates a perspective view of a variable flow module for fluid flow distribution systems in an open configuration in an alternate embodiment of the present invention.

Likewise, FIG. 9 illustrates a perspective view of variable flow module 100 wherein the rotatable plate 110 is rotated into an "open" position (or "+" position on the wing 180), whereby the first and second curved elements 150, 152 are open or are mostly open and do not cover the aperture 112, thereby allowing the flow of fluid therethrough.

Figure 10:
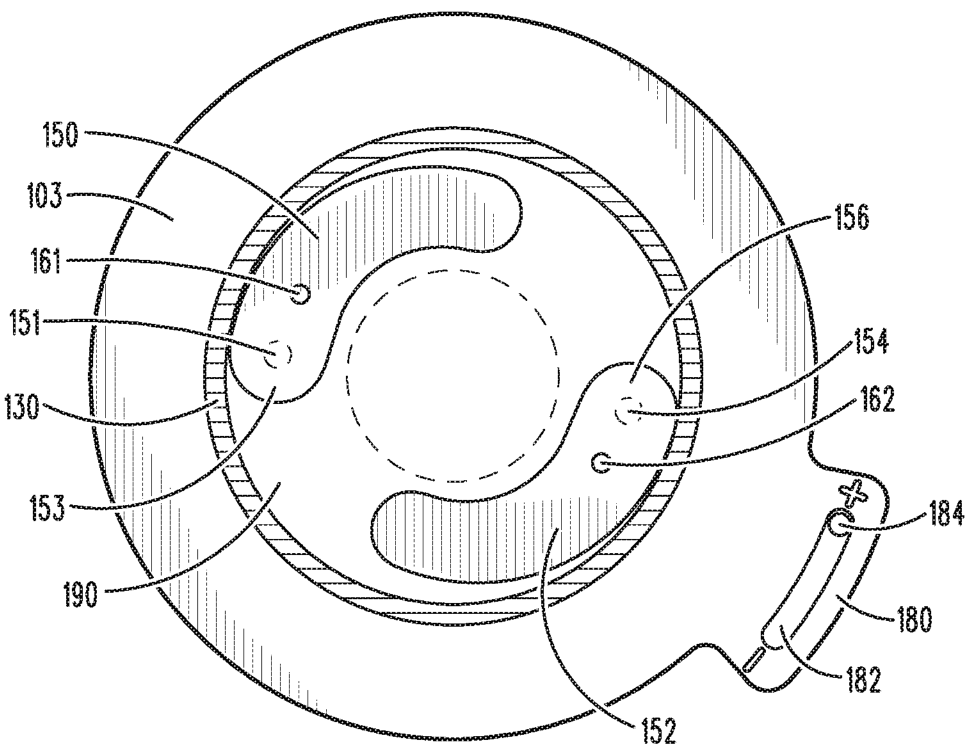
FIG. 10 illustrates a cross-sectional view of a variable flow module for fluid flow distribution systems along lines X-X in an alternate embodiment of the present invention.
Figure 11:
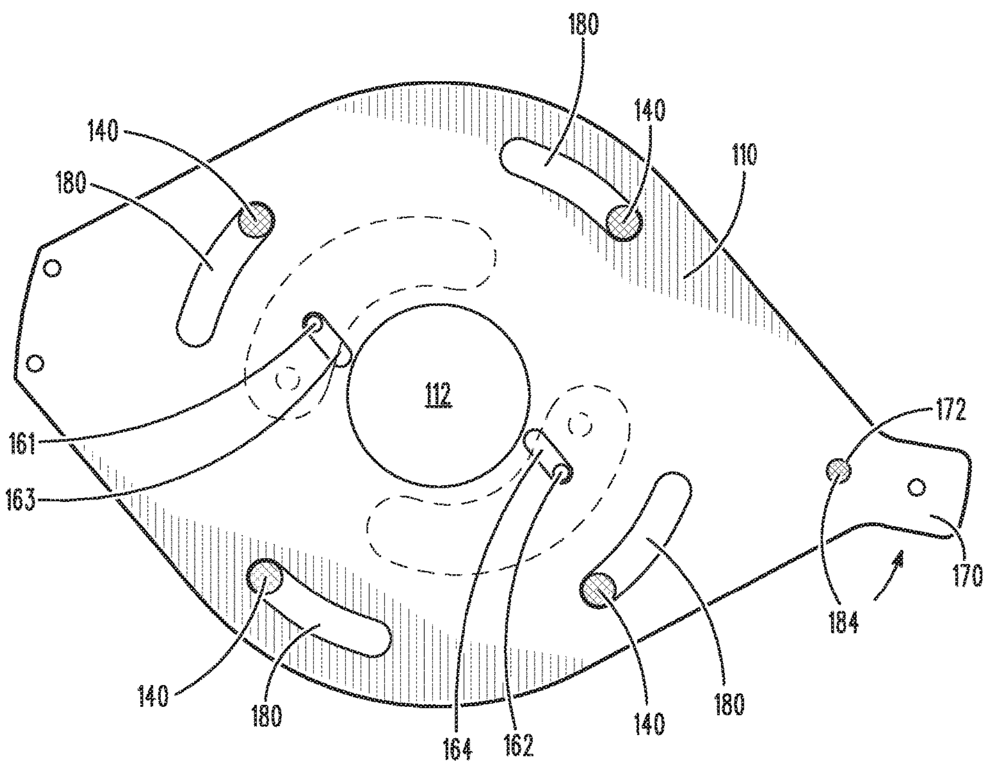
FIG. 11 illustrates a cross-sectional view of a variable flow module for fluid flow distribution systems along lines XI-XI in an alternate embodiment of the present invention.

FIG. 10 illustrates a cross-sectional view of the variable flow apparatus 100 along lines X-X in FIG. 9. Specifically, FIG. 10 illustrates a view of second main flange 103 having O-ring 130, and first and second curved elements 150, 152 that are rotated away from each other to open and allow fluid flow therethrough. As illustrated, the first curved element 150 comprises the pivoting pin 151 that may be rotatably disposed within the second main flange 103 (shown in phantom in FIG. 10) on a first end 153 of the first curved element 150. Further, first curved element 150 may comprise the traveling pin 161 that may travel within a slot 163 within rotatable plate 110, as illustrated in FIG. 11 when the rotatable plate 110 rotates. Further, second curved element 152 may have the pivoting pin 154 disposed on the first end 156 thereof, which may be rotatably disposed within the second main flange 103 (as shown in phantom in FIG. 10), and further may comprise the traveling pin 162 that may travel within slot 164 in the rotatable plate 110, as illustrated in FIGS. 9 and 11.

Moreover, FIG. 10 illustrates that the pin or bolt 184 is disposed toward the "+" position by rotation of the handle 170 (as illustrated in FIGS. 9 and 11), which causes the traveling pins 161, 162 to travel within the slots 163, 164, thereby rotating the first and second curved elements 150, 152 away from each other.

FIG. 11 illustrates a cross-sectional view of the variable flow apparatus 100 along lines XI-XI of FIG. 9, illustrates a plan view of the rotatable plate 110, rotated to cause the first and second curved elements 150, 152 to open and allow fluid flow through the aperture 112. Specifically, traveling pins 161, 162 may be disposed on one end of each of the slots 163, 164, whereby the positioning of the traveling pins 161, 162 is caused by rotating of the handle toward the "+" position. As the traveling pins 161, 162 move through the slots 163, 164, the first and second curved elements rotate and open away from each other.

Rotatable plate 110 further comprises bolt slots 180 allowing the rotatable plate 110 to rotate without restriction from bolts 140 that may bolt the first and second main flanges, as well as the rotatable plate 110, together.

As described above, the variable flow module apparatus 100 may be connected to pipes in a fluid distribution system, and the variable flow module apparatus 100 may alternately restrict or allow fluid flow therethrough. As seen in the figures above, the first and second curved elements 150, 152 may not be shaped and/or positioned to fully close over the aperture 112. Thus, even in its "closed" position, there may still be some fluid flowing therethrough. Thus, in a preferred embodiment, variable flow module apparatus 100 may be opened and closed between a fully open and partially or mostly closed.

The handle 170 may be moved manually by a user wishing to allow or restrict the flow of fluid therethrough. Alternatively, the handle 170 may be moved automatically via a controller that may be connected to the handle, such as via a linear actuator that may move the handle between the "-" and "+" positions. Specifically, sensors may be utilized to sense conditions within the pipe that may warrant opening the flow of fluid therethrough or restricting the flow of fluid therethrough, as needed. Alternatively, a user may cause the controller to open and/or close the apparatus, as desired. Thus the controller may be utilized to move the handle 170, thereby allowing or restricting the flow of fluid therethrough.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

We claim:

1. A variable flow module apparatus comprising:

a first plate having a first orifice;

a second plate having a second orifice;

a first rotatable element comprising a first terminal end, a second terminal opposite the first terminal end, a first surface on a first side thereof extending between the first and second terminal ends, and a second surface on a second side thereof extending between the first and second terminal ends, wherein the first rotatable element comprises a pivoting pin extending from a position proximal the first terminal end thereof and further extending from the first surface thereof and rotatably disposed in the first plate, and a second pin extending from a point proximal the pivoting pin at a position closer to the second terminal end than the pivoting pin and further extending from the the second surface thereof, the second pin engaging a first slot in the second plate;

a second rotatable element comprising a first terminal end, a second terminal end opposite the first terminal, a first surface on a first side thereof extending between the first and second terminal ends, and a second surface on a second side thereof extending between the first and second terminal ends, wherein the second rotatable element comprises a pivoting pin extending from a position proximal the first terminal end thereof and further extending from the first surface thereof and rotatably disposed in the first plate, and a second pin extending from a point proximal the pivoting pin at a position closer to the second terminal end than the pivoting pin and further extending from the second surface thereof, the second pin engaging a second slot in the second plate; and a handle extending from the second plate, wherein movement of the handle causes the second plate to rotate between a first position and a second position, thereby causing the first and second rotatable elements to move toward each other when the handle moves to the first position and away from each other when the handle moves to the second position as the second pin of the first rotatable element travels within the first slot of the second plate and the second pin of the second rotatable element travels within the second slot of the second plate.

2. The variable flow module apparatus of claim 1 wherein the first pin of the first rotatable element is rotatably engaged in an aperture in the first plate.

3. The variable flow module apparatus of claim 1 wherein the first pin of the second rotatable element is rotatably engaged in an aperture in the first plate.

4. The variable flow module apparatus of claim 1 further comprising a space between the first and second rotatable elements, wherein the space gets larger when the handle causes the first and second rotatable elements to move away from each other, and the space gets smaller when the handle causes the first and second rotatable elements to move towards each other.

5. The variable flow module apparatus of claim 1 further comprising:

a first gasket disposed between the first plate and the rotatable plate; and a second gasket disposed between the second plate and the rotatable plate.

6. The variable flow module apparatus of claim 5 wherein the gaskets are O-rings.

7. The variable flow module apparatus of claim 1 further comprising:

a first flange connected to a first pipe segment, the first pipe segment connected to the first plate; and a second flange connected to a second pipe segment, the second pipe segment connected to the second plate.

8. The variable flow module apparatus of claim 1 wherein the second plate comprises a depression to hold the first and second curved elements.

9. The variable flow module apparatus of claim 1 further comprising:

a plurality of bolts holding the first plate, the second plate and the rotatable plate together.

10. The variable flow module apparatus of claim 9 further comprising:

a plurality of slots in the rotatable plate to receive the plurality of bolts, wherein the plurality of slots allows rotation of the rotatable plate when the handle rotates the rotatable plate.

11. A method of restricting fluid flow through a pipe system, the method comprising the steps of:

providing a variable flow module apparatus comprising:

a first plate having a first orifice;

a second plate having a second orifice;

a first rotatable element comprising a first terminal end, a second terminal opposite the first terminal end, a first surface on a first side thereof extending between the first and second terminal ends, and a second surface on a second side thereof extending between the first and second terminal ends, wherein the first rotatable element comprises a pivoting pin extending from a position proximal the first terminal end thereof and further extending from the first surface thereof and rotatably disposed in the first plate, and a second pin extending from a point proximal the pivoting pin at a position closer to the second terminal end than the pivoting pin and further extending from the the second surface thereof, the second pin engaging a first slot in the second plate;

a second rotatable element comprising a first terminal end, a second terminal end opposite the first terminal, a first surface on a first side thereof extending between the first and second terminal ends, and a second surface on a second side thereof extending between the first and second terminal ends, wherein the second rotatable element comprises a pivoting pin extending from a position proximal the first terminal end thereof and further extending from the first surface thereof and rotatably disposed in the first plate, and a second pin extending from a point proximal the pivoting pin at a position closer to the second terminal end than the pivoting pin and further extending from the second surface thereof, the second pin engaging a second slot in the second plate; and a handle extending from the second plate, wherein movement of the handle causes the second plate to rotate between a first position and a second position, thereby causing the first and second rotatable elements to move toward each other when the handle moves to the first position and away from each other when the handle moves to the second position as the second pin of the first rotatable element travels within the first slot of the second plate and the second pin of the second rotatable element travels within the second slot of the second plate, wherein the variable flow module apparatus is disposed between a first pipe and a second pipe having fluid flowing therethrough; and moving the handle to change the volume of the fluid through the variable flow module apparatus.

12. The method of claim 11 wherein moving the handle comprises moving the handle in a first direction, which causes the first and second rotatable elements to move toward each other causing a space between the first and second rotatable elements to get smaller, thereby decreasing the flow of fluid through the variable flow module apparatus.

13. The method of claim 11 wherein moving the handle comprises moving the handle in a second direction, which causes the first and second rotatable elements to move away from each other causing a space between the first and second rotatable elements to get larger, thereby increasing the flow of fluid through the variable flow module apparatus.

14. The method of claim 11 wherein the handle is moved manually.

15. The method of claim 14 wherein the controller moves the handle based on feedback from a sensor.

16. The method of claim 11 wherein the handle is moved automatically via a controller.

17. The method of claim 11 wherein the variable flow module apparatus further comprises a first flange connected to a first pipe segment, the first pipe segment connected to the first plate; and a second flange connected to a second pipe segment, the second pipe segment connected to the second plate.

18. The method of claim 11 wherein the variable flow module apparatus further comprises a first gasket disposed between the first plate and the rotatable plate; and a second gasket disposed between the second plate and the rotatable plate.

19. The method of claim 18 wherein the first and second gaskets are O-rings.

20. The method of claim 11 wherein the rotatable plate comprises at least one slot and a bolt disposed through the slot, the slot restricting rotation of the rotatable plate between the first position and the second position.

* * * * *